(12) United States Patent
Shenoy et al.

(10) Patent No.: US 9,591,418 B2
(45) Date of Patent: Mar. 7, 2017

(54) METHOD, APPARATUS AND COMPUTER PROGRAM FOR GENERATING AN SPATIAL AUDIO OUTPUT BASED ON AN SPATIAL AUDIO INPUT

(71) Applicant: Nokia Corporation, Espoo (FI)

(72) Inventors: Ravi Shenoy, Bangalore (IN); Soumik Ukil, Bangalore (IN); Gururaj Putraya, Bangalore (IN); Krishna Govindarao, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 43 days.

(21) Appl. No.: 14/391,851

(22) PCT Filed: Feb. 21, 2013

(86) PCT No.: PCT/IB2013/051409
§ 371 (c)(1),
(2) Date: Oct. 10, 2014

(87) PCT Pub. No.: WO2013/153464
PCT Pub. Date: Oct. 17, 2013

(65) Prior Publication Data
US 2015/0078556 A1    Mar. 19, 2015

(30) Foreign Application Priority Data

Apr. 13, 2012  (IN) .............. 1491/CHE/2012

(51) Int. Cl.
*H04R 5/02* (2006.01)
*H04R 29/00* (2006.01)
(Continued)

(52) U.S. Cl.
CPC .............. *H04R 29/00* (2013.01); *G06F 3/16* (2013.01); *H04S 7/302* (2013.01)

(58) Field of Classification Search
CPC ......... H04N 21/42203; H04N 21/4223; H04N 21/4334; H04N 5/23219; H04N 5/23296;
(Continued)

(56) References Cited

U.S. PATENT DOCUMENTS 5,686,957 A    11/1997  Baker .............................. 348/36
8,477,970 B2 *  7/2013  Strub ..................... H04S 7/301
                                                                381/310
(Continued)

FOREIGN PATENT DOCUMENTS

EP        2 352 290 A1    8/2011
WO   WO 2008/122974 A1   10/2008

OTHER PUBLICATIONS

Adams, A., et al., "The Stanford Multi-Carmera Array", http://graphics.stanford.edu/projects/array, Feb. 10, 2014, 2 pgs.
(Continued)

*Primary Examiner* — Paul S Kim
*Assistant Examiner* — Norman Yu
(74) *Attorney, Agent, or Firm* — Harrington & Smith

(57) ABSTRACT

A method, apparatus and computer program for: receiving a spatial audio input; determining a direction of interest from the spatial audio input; and generating a spatial audio output dependent on the spatial audio input and the direction of interest.

18 Claims, 7 Drawing Sheets

(51) Int. Cl.
*H04S 7/00* (2006.01)
*G06F 3/16* (2006.01)

(58) Field of Classification Search
CPC .. H04R 3/005; H04R 1/406; H04R 2201/401;
H04R 2430/20; H04R 2499/11; B60K
2350/1004; G01S 15/04; G01S 15/523;
G06K 9/00711; H04S 7/302
USPC ..... 381/26, 56, 17, 306, 77; 348/231.4, 515;
704/258; 715/728; 725/18
See application file for complete search history.

(56) References Cited

U.S. PATENT DOCUMENTS

| | | | | |
|---|---|---|---|---|
| 2002/0075295 | A1 | 6/2002 | Stentz et al. | 345/727 |
| 2004/0001137 | A1 | 1/2004 | Cutler et al. | 348/14.08 |
| 2004/0257432 | A1* | 12/2004 | Girish | H04N 7/142 |
| | | | | 348/14.08 |
| 2009/0015658 | A1 | 1/2009 | Enstad et al. | 348/14.08 |
| 2009/0028347 | A1 | 1/2009 | Duraiswami et al. | 381/26 |
| 2009/0116652 | A1 | 5/2009 | Kirkeby et al. | 381/1 |
| 2010/0026780 | A1 | 2/2010 | Tico et al. | 348/14.02 |
| 2010/0245624 | A1 | 9/2010 | Beaucoup | 348/231.4 |
| 2011/0083075 | A1* | 4/2011 | MacNeille | B60K 37/06 |
| | | | | 715/728 |
| 2011/0164141 | A1 | 7/2011 | Tico et al. | 348/207.99 |

OTHER PUBLICATIONS

Ng, R., et al., "Light Field Photography with a Hand-Held Plenoptic Camera", Stanford University Computer Science Tech Report CSTR Feb. 2005, Apr. 2005, 2 pgs.

Veeraraghaven, A., et al., "Dappled Photography: Mask Enhanced Cameras for Heterodyned Light Fields and Coded Aperture Refocusing", ACM SIGGRAPH 2007, 4 pgs.

Georgeiv, T., et al., "Light field Camera Design for Integral View Photography", http://www.tgeorgiev.net/IntegralView, © 2003 Adobe Systems Inc., 13 pgs.

Kuo, P-J, et al., "MPEG-7 Based Dozen Dimensional Digital Content Architecture for Semantic Image Retrieval Services", © 2004 IEEE, 8 pgs.

"Objectives of the MUSCADE project" Mar. 15, 2012, www.muscade.eu/objectives.html, 2 pgs.

Menegatti, E., et al., "A Surveillance System based on Audio and Video Sensory Agents cooperating with a Mobile Robot", http:www.dei.inipd.it~emg/papers/emg1AS8-Audio.pdf, 2004, 9 pgs.

* cited by examiner

METHOD, APPARATUS AND COMPUTER PROGRAM FOR GENERATING AN SPATIAL AUDIO OUTPUT BASED ON AN SPATIAL AUDIO INPUT

FIELD OF THE INVENTION

Embodiments of the present invention relate to spatial audio. In particular, though without prejudice to the foregoing, various embodiments relate to a method, apparatus and computer program for modifying spatial audio. Yet further embodiments relate to a method, apparatus and computer program for modifying spatial audio and spatial video.

BACKGROUND TO THE INVENTION

The capturing and rendering of audio and video content is well known. However, once captured, the options for adjusting audio and video content, for example transforming their spatial characteristics such as relating to their perceived directionality when rendered, are limited.

Some embodiments of the present invention seek to improve the ability to modify audio content, and certain further embodiments seek to improve the ability to modify audiovisual content, so as to enhance a user's perception of the content.

The listing or discussion of any prior-published document or any background in this specification should not necessarily be taken as an acknowledgement that the document or background is part of the state of the art or is common general knowledge. One or more aspects/embodiments of the present disclosure may or may not address one or more of the background issues.

BRIEF DESCRIPTION OF VARIOUS EMBODIMENTS OF THE INVENTION

According to various, but not necessarily all, embodiments of the invention there is provided a method comprising causing, at least in part, actions that result in:
  receiving a spatial audio input;
  determining a direction of interest from the spatial audio input; and
  generating a spatial audio output dependent on the spatial audio input and the direction of interest.

According to various, but not necessarily all, embodiments of the invention there is provided an apparatus comprising:
  means for receiving a spatial audio input;
  means for determining a direction of interest from the spatial audio input; and
  means for generating a spatial audio output dependent on the spatial audio input and the direction of interest.

According to various, but not necessarily all, embodiments of the invention there is provided a computer program comprising computer program instructions that, when performed by at least one processor, causes the following to be performed:
  receive a spatial audio input;
  determine a direction of interest from the spatial audio input; and
  generate a spatial audio output dependent on the spatial audio input and the direction of interest.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
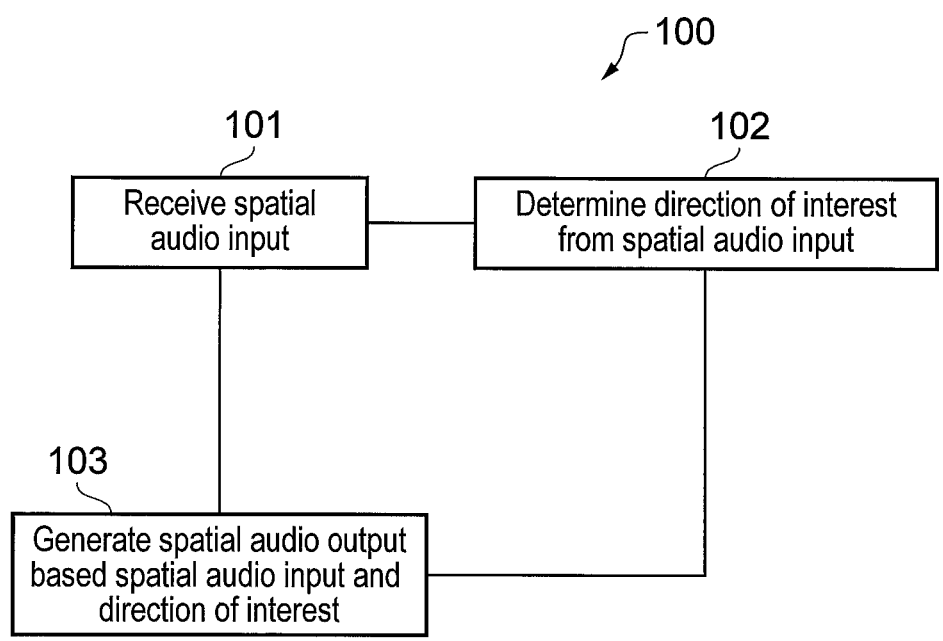
FIG. 1 schematically illustrates a flow chart of a method according to an embodiment of the invention.

The Figures schematically illustrate a method 100 comprising:
  receiving 101 a spatial audio input;
  determining 102 a direction of interest from the spatial audio input; and
  generating 103 a spatial audio output based on the spatial audio input and the direction of interest.

The term spatial audio input relates to an audio input which is associated with a spatial position and/or direction of sounds. The spatial audio input comprises information indicative or representative of both aural information (e.g. frequency and amplitude of a sound) and spatial information (e.g. positional and directional information). For example, the spatial audio input could be from spatial audio capture device (such as a plurality of audio sensors/microphones arranged in an array) configured to capture a sound field/'soundscape'. Accordingly, a spatial audio input is an input that is able to convey aural spatial directivity, for example with respect to a frame of reference of the spatial audio capture device. In certain embodiments of the invention, aural spatial directivity relates to spatial positions, e.g. in terms of azimuth and elevation, of audio sources with respect to a microphone array (as opposed to aural spatial directivity relating to a radiation pattern of the audio source).

The term direction of interest may relate to a direction of a particular aural cue/sound in the spatial audio input with respect to a particular frame of reference. The aural cue may correspond to direction of a dominant sound source or voice activity which is identified from the spatial audio input. The direction of interest need not relate to a direction of the aural cue with respect to the frame of reference of the spatial audio input itself (e.g. the spatial audio capture device) but it may instead be determined with respect to another frame of reference, such as a frame of reference related to spatial audio rendering device (e.g. an array of speakers) or even a frame of reference related to a spatial visual rendering device as will be discussed further below. A relative position/direction of the aural cue with respect to a frame of reference of the spatial audio input may be duly rotated and/or translated to the particular frame of reference to provide the direction of interest. Thus, the direction of interest may be determined based on the spatial audio input and may also be determined with respect to a particular frame of reference.

The spatial audio output that is generated may thus have an aural directivity that is dependent on a direction of interest which is itself at least partly determined from the spatial audio input. Thus, the spatial aural directivity of the spatial audio output can be guided by a position of an aural cue of a spatial audio input. For example, the spatial audio output may thus be configured such that its perceived spatial aural directivity when rendered on a spatial audio rendering device tracks the position of the aural cue such that the aural cue is perceived as coming directly ahead of a listener. This change of aural direction is based on the determined direction of interest, i.e. the aural spatial directivity of the spatial audio output may be transformed so as to align with the direction of interest.

In effect, certain embodiments provide a spatial audio output whose aural spatial directivity is adjusted/re-directed based on a direction of interest determined at least in part from the spatial audio input itself. Accordingly, a user hearing the spatial audio output perceives the aural spatial directivity in a direction which is determined from the spatial audio input itself. I.e. embodiments provide a change of aural perspective based on an aural cue in a captured sound field. Such embodiments of the invention seek to provide an improved method and apparatus for generating a spatial audio output whose aural spatial directivity is dependent on a direction of interest derived from a spatial audio input. Advantageously, this enables the spatial direction of aural cues in the spatial audio output to be correlate to a new aural perspective ("field of hearing") wherein the direction of the aural perspective corresponds to a direction of interest derived from the spatial audio input.

In certain other embodiments, a spatial visual output is generated based on the determined direction of interest. For example, a spatial visual output might be associated with a particular field of view of an image capture device and the field of view is chosen based on the determined direction of interest. Thus, the spatial visual directivity (field of view) of the spatial visual output corresponds to the direction of interest. Alternatively, the visual output may correspond to an image synthesised from a visual spatial input so as to have a spatial visual directivity (field of view) that corresponds to the direction of interest. In effect, such embodiments provide a spatial visual output whose visual spatial directivity is determined based on the direction of interest determined from the spatial audio input. Thus, a user viewing the visual output perceives a visual spatial directivity in a direction which is determined from the spatial audio input itself. I.e. embodiments provide a change of visual perspective based on a direction of an aural cue in a captured sound field. Furthermore, since the aural perspective of the spatial audio output is also likewise based on the direction of the aural cue, the perceived visual and aural spatial directionalities can be matched/synchronised. Such embodiments seek to provide an improved method and apparatus for generating spatial audio and spatial visual outputs whose respective aural and visual spatial directivities are both matched to a direction of interest derived from a spatial audio input. Advantageously, the matching of the spatial directions of both aural cues and visual cues enhances a user's perception of the audio and video outputs by providing spatially coherent audio and visual outputs, i.e. a "field of hearing" that matches a field of view. In other words, spatial characteristic of the generated audio output are matched to spatial characteristics of the generated visual output.

In some further embodiments, a spatial visual input is received and, based on the spatial visual input, a determination is made of positional information relating to one or more imaged objects and the spatial audio input is modified based on the determined positional information to generate a spatial audio output. For example, the generated spatial audio output may be dependent on determined perceived depths/distances of imaged objects. Also, as will be discussed in further detail below, the spatial audio output could be modified so as to take into account 'audio eclipsing' or 'audio shadowing' that may occur when a visual spatial perspective changes.

Description

An example of methods and apparatuses according to embodiment of the invention will now be described with reference to the Figures. Similar reference numerals are used in the Figures to designate similar features. For clarity, all reference numerals are not necessarily displayed in all figures.

FIG. 1 schematically illustrates a flow chart of a method 100 according to an embodiment of the invention.

In block 101, a spatial audio input is received. Spatial audio input is a generic term that encompasses audio input signals able to represent information relating to aural spatial directivity, i.e. a direction of aural spatial directivity of an aural cue/sound. Accordingly, the spatial audio input is able to convey sound information as well as provide the ability to derive positional or directional information of the source sound and spatially separate audio sources. For example, the spatial audio input may correspond to a multi-channel input of signal(s) from a spatial audio capture device/system configured to capture a soundscape/sound field. Such a device/system may comprise an array of audio sensors, audio capture devices or microphones from which it is possible to determine a relative position/location and/or direction/orientation of a source of sound with respect to a frame of reference, such as a frame of reference of the spatial audio capture device. Such positional information can be derived by either determining the time delays of arrival of a sound between different microphones or using other spectral methods.

In block 102, a direction of interest is determined from the spatial audio input. A position of an aural cue/source of sound is determined from the spatial audio input. The direction of interest may be determined by calculating a direction from a particular origin point to the position of the aural cue/source of sound. The sound cue may comprise an identified dominant audio source or an identified voice activity in the spatial audio input.

The direction of interest corresponds to a direction of the sound cue with respect a particular origin point. The origin point may relate to any origin point, for example an origin of a frame of reference of:
 a spatial audio capture device,
 a spatial audio rendering device,
 a spatial visual capture device, or
 a spatial visual rendering device.

Alternatively, the origin point may relate to a virtual perception point, for example a virtual listening point and/or a virtual view. This might correspond to a virtual point from where there is to be visual perception of a light field/ landscape and aural perception of a sound field/soundscape rendered based on spatial audio and visual outputs (as will be described in greater detail below).

Where the origin point/frame of reference from which the direction of interest is to be with respect to is not coincident with the origin point/frame of reference of the spatial audio input (e.g. the spatial audio capture device) then an appropriate transformation (e.g. translation and/or rotation) of the direction of the aural cure with respect to the spatial audio capture device is applied.

In block 103, a spatial audio output is generated that is based on both the spatial audio input and the direction of interest. The spatial audio output may be synthesised from the spatial audio input. In this process, the spatial directivity of the spatial audio input is transformed/adjusted based on the direction interest, for example such that the spatial directivity of the spatial audio output is aligned with the direction of interest so that the aural cue is perceived as coming directly ahead of a listener when the spatial audio output is rendered on a spatial audio output device (e.g. headphones).

The transformation spatial audio input and generation of the spatial audio output is such that the spatial audio is re-synthesised so at to be spatially synchronised with the direction of interest. The transformation may involve processing the spatial audio input with algorithms so appropriately re-direct the spatial directivity of the spatial audio so as to be aligned with the direction of interest. Head related transfer function (HRTF) or Head Related Impulse Response (HRIR) algorithms or other digital filters implemented using signal processing blocks (finite impulse response filters) may be applied to the spatial audio input. The spatial directivity of the spatial audio output may be adjusted such that the spatial cue is perceived to be coming in a direction directly ahead of ahead of the listener.

Figure 2:
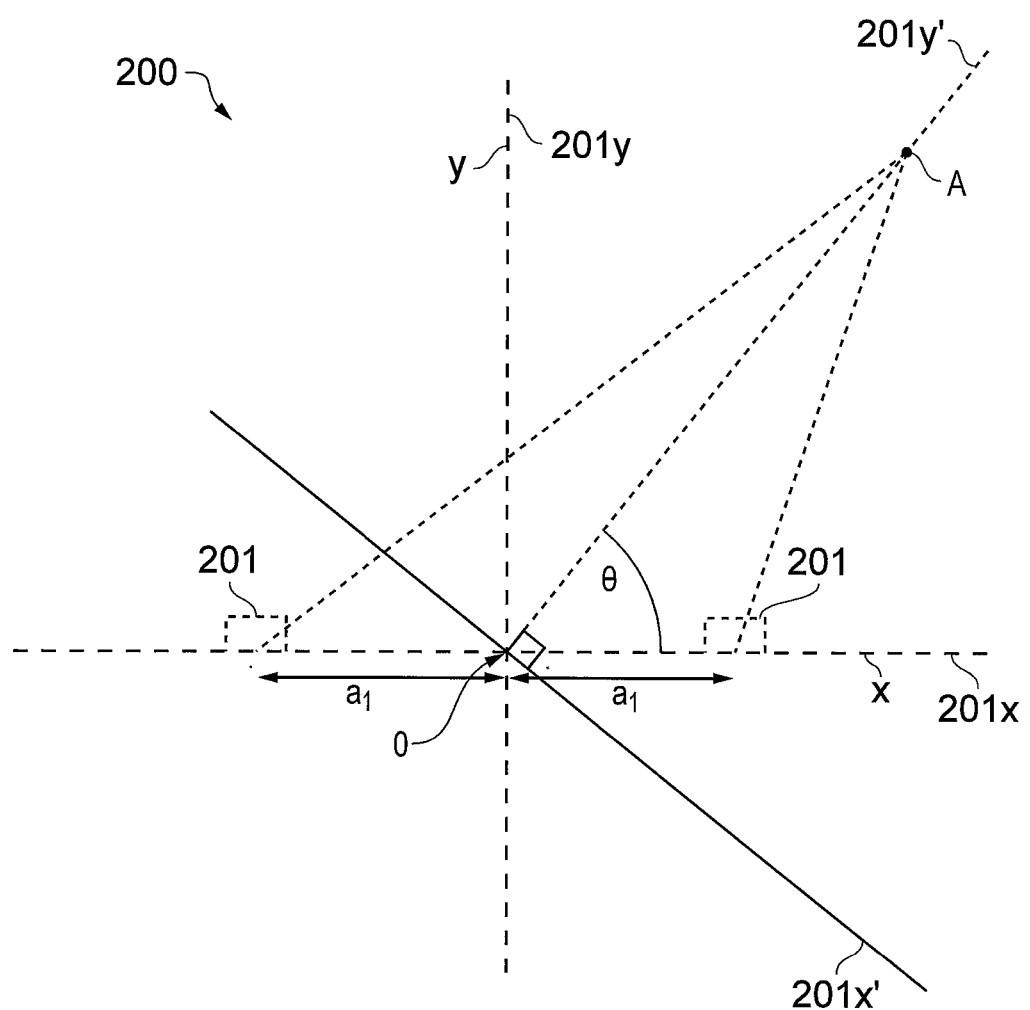
FIG. 2 schematically illustrates a block diagram of an arrangement for spatial audio capture.

FIG. 2 schematically illustrates a block diagram of an arrangement of a spatial audio capture apparatus 200 for use with certain embodiments of the present invention. Only the functional components that are necessary for describing the operation of the apparatus are mentioned.

The spatial audio capture apparatus comprises a plurality of audio sensors 201, such as microphones, which are arranged in an array. For simplicity only two audio sensors are shown which are equally spaced, a1, from an origin, O, of a frame of reference, $201x$ $201y$, of the spatial audio capture apparatus 200. It will be appreciated that more audio sensors could be provided in differing configurations and not necessarily linearly aligned as shown.

An aural cue, A, i.e. a source of sound is identified (i.e. by identifying a dominant sound or identifying voice activity from the spatial audio input). Positional information of the aural cue is determined from the spatial aural input, such as its position x, y with respect to the frame of reference, $201x$ $201y$ of spatial capture apparatus 200.

This positional information derived from the spatial audio input is used to determine a "direction of interest". In order to determine a direction, a starting point and an end point are required. The starting point for the direction of interest need not coincide with the origin of the frame of reference for the spatial audio capture apparatus. Indeed, origin or frame of reference for the direction of interest may correspond to a translation and a rotation of the frame of reference for the spatial audio capture apparatus. The starting point for the direction of interest and frame of reference for the direction of interest could relate to a frame of reference of:
　a spatial audio rendering apparatus, or
　a spatial visual capture apparatus, or
　a spatial visual rendering device, or
　a perception point from where aural and visual perception are to be perceived.

For ease of explanation, the origin for the direction of interest is taken to be coincident with the origin of the spatial audio capture's frame of reference $201x$, $201y$.

Accordingly, taking the origin as point O and the end point as x, y, the direction of interest θ is determined. Where necessary, an appropriate transformation of such an determined direction could be applied, i.e. a translation (and rotation if required) such that the direction of interest is with respect to an origin in a particular frame of reference.

Having established a direction of interest, θ, a spatial audio output is generated based on the spatial audio input and the direction of interest. In this process, the spatial directivity of the spatial audio input is transformed based on the direction of interest, e.g. the spatial directivity of the spatial audio input is rotated by θ degrees such that the spatial directivity is centred about an axis $201y'$ and is aligned with the direction of interest. In this manner, the spatial directivity of the spatial audio output is aligned so as to coincide with the direction of interest. Accordingly, the spatial audio input is transformed such that, when rendered and perceived from the origin point, O, of the frame of reference for the direction of interest, the aural cue is perceived to be coming in a direction directly ahead of the listener.

Figure 3:
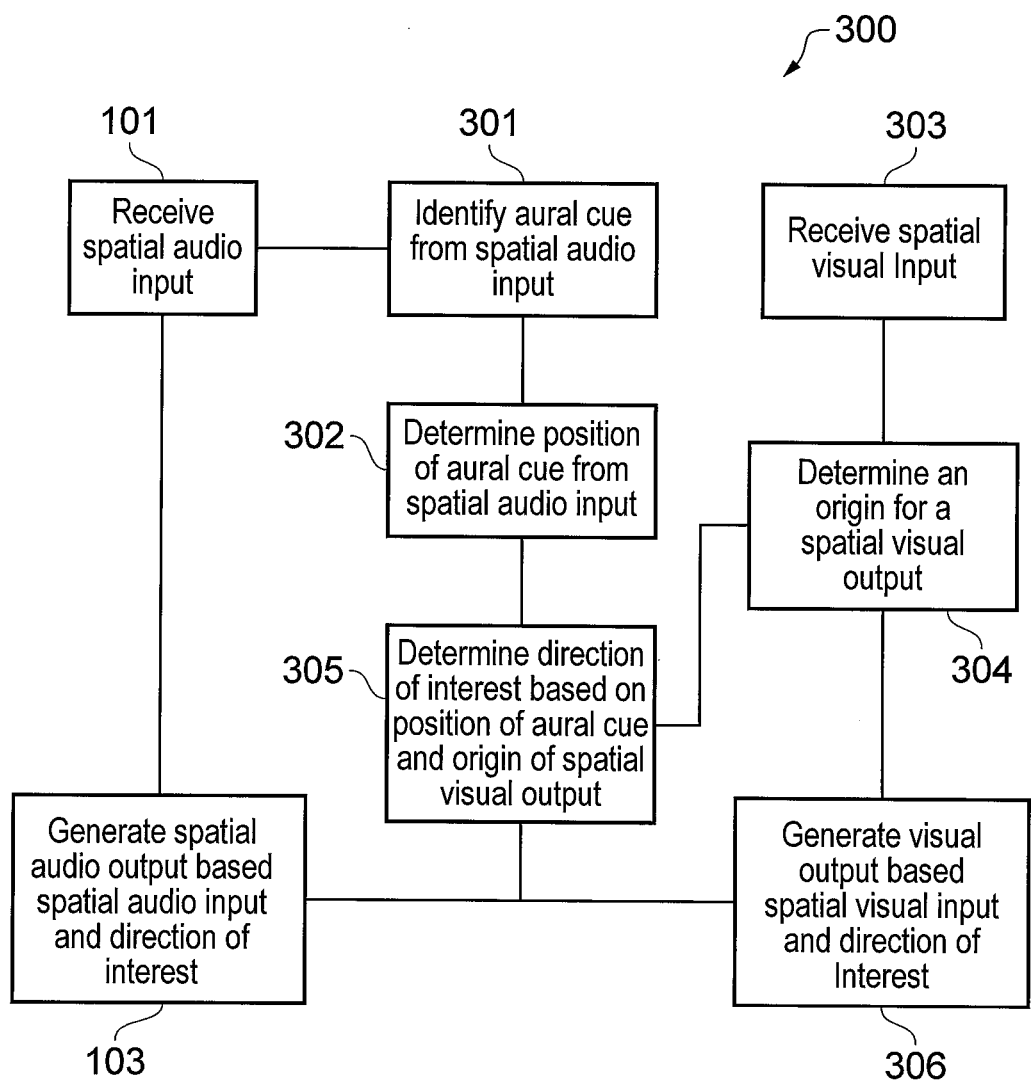
FIG. 3 schematically illustrates a flow chart of a method according to a further embodiment of the invention.

FIG. 3 schematically illustrates a flow chart of a method 300 according to a further embodiment of the invention. In this embodiment, as well as generating a spatial audio output that is based a direction of interest derived from spatial audio input, a spatial visual output is generated that is also based the direction of interest derived from spatial audio input.

The method comprises blocks 101 and 103 as per FIG. 1. However, the method additionally comprises block 301 wherein an aural cue is identified from the received spatial audio input and block 302 wherein a position of the aural cue is determined from on the spatial audio input.

In block 303 a spatial visual input is received. The term spatial visual input relates to a visual input which is associated with a spatial direction, i.e. the input is indicative of a spatial position and/or direction of an image such that the spatial visual input has a visual spatial directivity or a direction/field of view associated with an image.

The spatial visual input may comprise information representative of both visual information and spatial information (e.g. positional and/or directional information) relating to a field of view that the image relates to. Accordingly, a spatial visual input is an input that is able to convey visual spatial directivity. The spatial visual input can be considered as a visual analogy to the spatial audio input. The spatial visual input could be a multichannel signal input from a plurality of image sensors that are arranged in an array and which are configured to capture various fields of view and/or capture a light field.

The spatial visual input is a generic term that encompasses an image/video input signal representative of an image/video perceived at a particular point of a frame of reference/field of view. For example, the spatial visual input may correspond to a multi-channel input of signal(s) from a spatial image capture device/system configured to capture:
　a) a light field (such as a light field camera) or
　b) a wide angle image (such as a panoramic camera) or
　c) a plurality of images from differing viewpoints (such as a plurality of cameras having differing field of view).

A spatial visual capture device/system may comprise one or more image sensors/image capture devices for capturing an image wherein the image is associated with a particular direction/orientation/field of view with respect to a frame of reference of the image capturing device.

In block 304, an origin point is determined for a spatial visual output. This may relate to a position from where a viewer is to view a spatial visual output when rendered, i.e. the origin may be an observation point from where a user is to perceive both the spatial visual output and the spatial audio output.

In block 305, the direction of interest is determined based on the positional information derived from the spatial audio input and the origin determined in block 304 which is related to a perception/observation point, e.g. a position from where a spatial visual output is to be viewed.

In block 306, a visual output is generated from the spatial visual input that is based on the direction of interest, which is itself derived from the spatial audio input. The visual output may be associated with a direction of a field of view and the direction of the field of view may be based on the direction of interest determined in block 305. The generation of the visual output may comprise selecting a direction of visual spatial directivity of the visual output that corresponds to the direction of interest. Alternatively, the generation of the visual output may comprise synthesising, from the spatial visual input, an image which is associated with a direction of a field of view wherein the direction of the field of view corresponds to the direction of interest The visual output could be:
a) a synthesis, from the spatial visual input, of an image having a direction of a field of view that corresponds to the direction of interest
b) a selection of a portion of a wide angle image where the selected portion relates to a direction of a field of view that corresponds to the direction of interest
c) a image from one of a plurality of image capture devices, wherein the image capture device is selected whose direction of field of view corresponds to the direction of interest.

Advantageously, this method enables a direction of view associated with an image output to be based on a spatial audio input, i.e. a viewing angle be changed based on the direction of an aural cue of a spatial audio input. Thus, the direction of view of the spatial visual output can track the aural cue.

In certain embodiments, the direction of view of the image output is aligned/coincident with the direction of interest derived from the spatial audio input. That way, the direction of view can be synchronised with a direction of interest based on a position of an aural cue. Furthermore, the accompanying spatial audio output is likewise adjusted based on the direction of interest.

Figure 4:
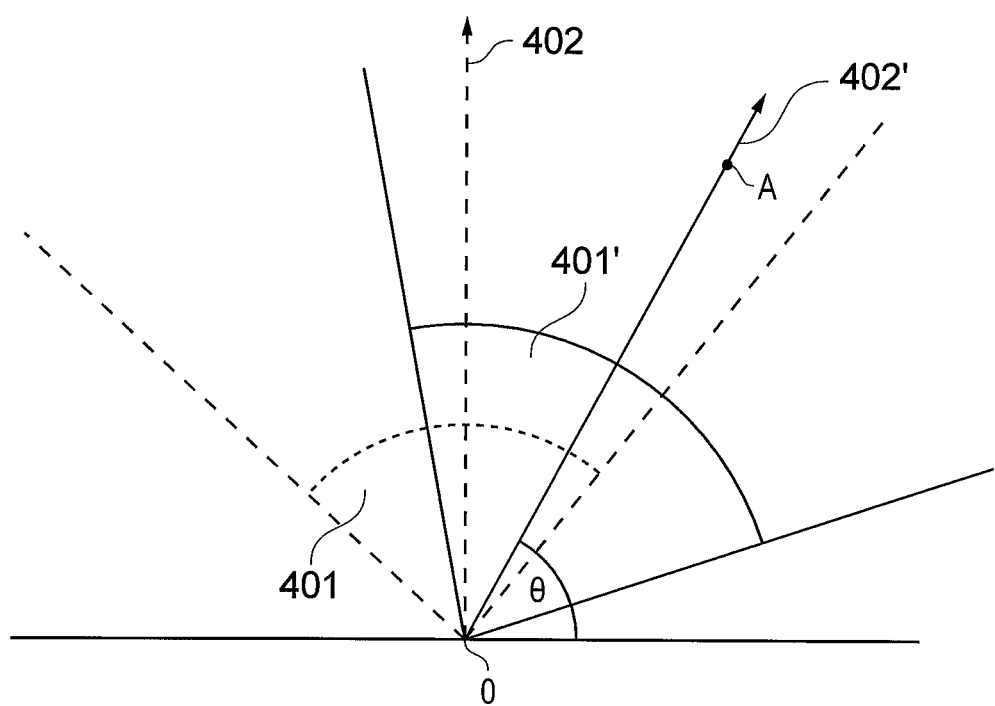
FIG. 4 schematically illustrates an adjustment of a field of view.

Accordingly, a viewing direction may be chosen based on a direction of interest derived from the spatial audio input and also the spatial audio output is matched with the direction of view, thereby enhancing a user's perception of the audio and visual outputs FIG. 4 schematically illustrates the adjustment of a field of view following the method of FIG. 3.

401 is an initial field of view of an initial spatial visual output, i.e. prior to undergoing the method of claim 3. This may correspond to a visual output having a spatial visual directivity, i.e. field of view, centred about a first axis 402. However, following the process of method 3, a spatial visual output is generated that has a different spatial visual directivity/field of view, namely 401' centred about an axis 402', wherein the axis 402' corresponds to a rotation of the first axis 402 by θ degrees. This re-orientated field of view 401' is such that it is aligned with the direction of interest determined in block 305 based on a position of an aural cue, A.

Again, as previously discussed, where necessary and appropriate transformation (translation and rotation of point of origin and frames of references can be effected if necessary).

In one embodiment, the spatial visual input comprises light field information, for example as obtained from a plenoptic camera or light field camera (such as available from Lytro, Inc). In such a case, the spatial visual output generated in block 306 corresponds to a synthesising of an image that would be perceived from a virtual field of view at a given origin point. Here, the virtual field of view is set to correspond to the direction of interest. There are various ways of capturing a light field, such as:

Multiple Lenses: using multiple lenses in front of a conventional camera. (http://www.tgeorgiev.net/IntegralView.pdf)
Micro-lens Array: using an array of micro-lens. (http://graphics.stanford.edu/papers/lfcamera)
Camera Array, using an array of cameras. (http://graphics.stanford.edu/projects/array)
Coded Aperture, using masks in a camera's optical path. (http://www.umiacs.umd.edu/~aagrawal/sig07/index.html).

A light field is a 4-Dimensional function of light with direction (2-Dimensional) and spatial co-ordinates (2-Dimensional). A light field camera captures 4D light field information about a visual scene. Advantageously, capturing a light field enables different views of a scene to be imaged from the capture light field, e.g. at different angles (and also at differing depths of field). This adaptable-view feature of light field capture enables a direction of view/field of view to be changed during or even post capture. In block 306 of the method of FIG. 3, the field of view that an image relates to is guided based on a direction of an audio source. Furthermore, the spatial directivity of the audio output is also likewise based on a direction of an audio source. Advantageously, using a light field capture device and light field data as the spatial visual input, even post capture of audio and video content, the audio and video can be spatially matched and aligned with a direction of interest (which is based on the spatial audio input) so as to provide an improved perception of the content to a user such that the user's visual spatial perception and aural spatial perception are aligned and directed towards an audio cue of interest.

Figure 5:
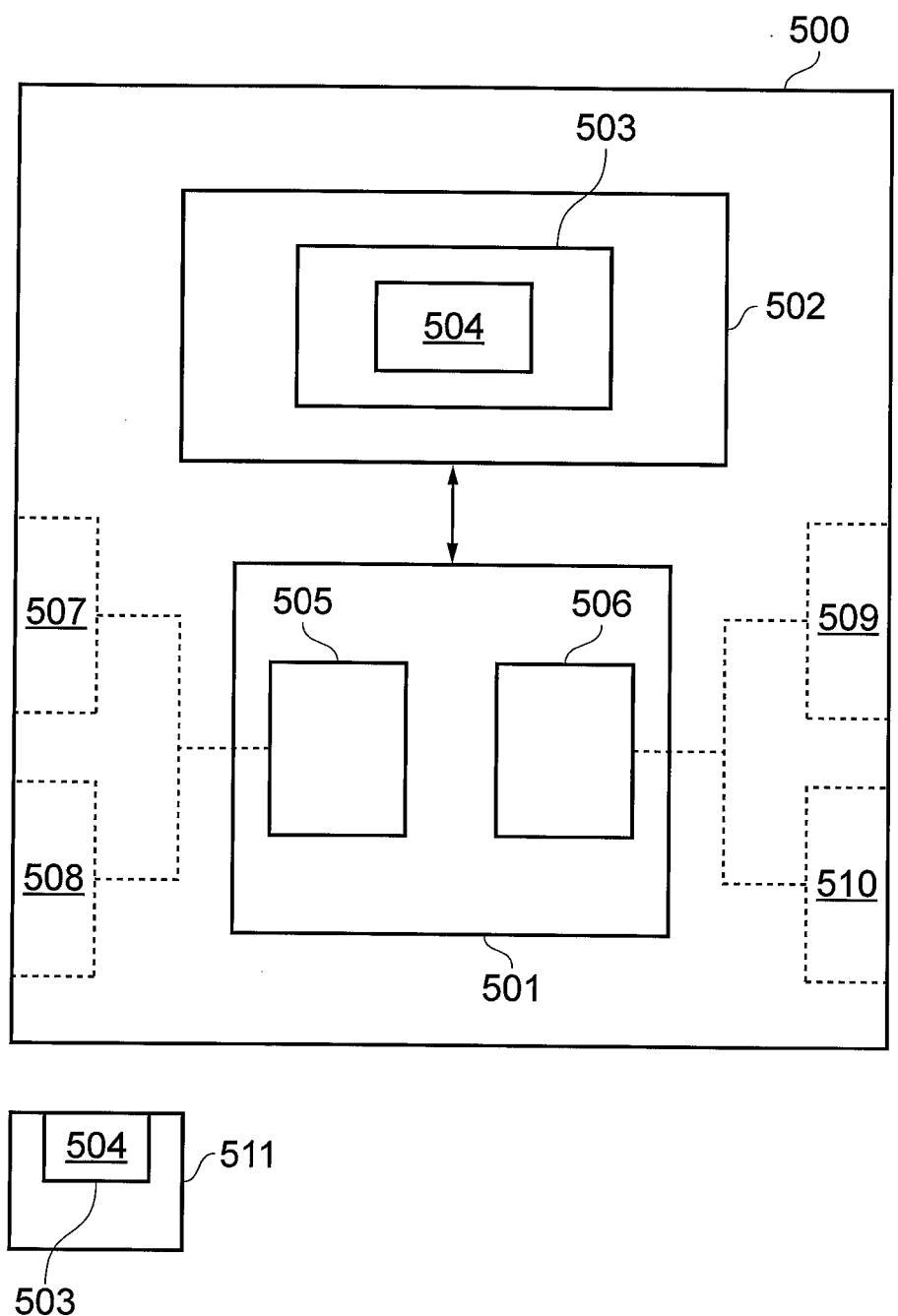
FIG. 5 schematically illustrates a block diagram of an apparatus according to various embodiments on the invention.

FIG. 5 schematically illustrates a block diagram of an apparatus 500 according to various embodiments on the invention. The component blocks are functional and the functions described may or may not be performed by a single physical element as shown.

The apparatus 500 comprises: at least one controller or processor 501; and at least one memory 502. The memory stores a computer program 503 comprising computer program instructions 504 that control the operation of the apparatus 500 when loaded into the processor 501. The computer program instructions provide the logic and routines that are enables the apparatus to perform the methods described.

Implementation of controller can be in hardware alone (a circuit, a processor . . . ), have certain aspects in software including firmware alone or can be a combination of hardware and software (including firmware). The controller may be implemented using instructions that enable hardware functionality, for example, by using executable computer program instructions in a general-purpose or special-purpose processor that may be stored on a computer readable storage medium 511 (disk, memory etc) or carried by a signal carrier to be performed by such a processor.

Figure 6:
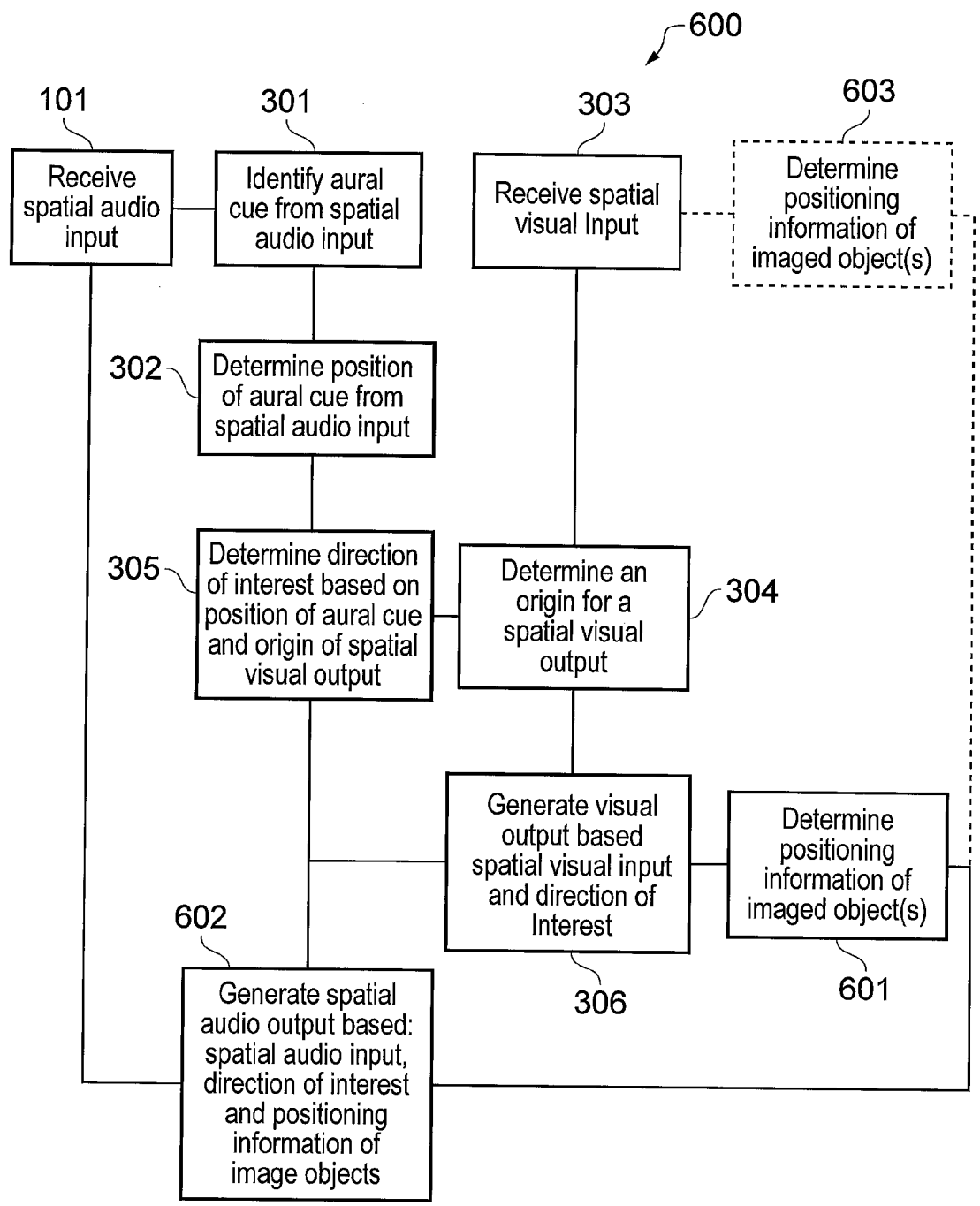
FIG. 6 schematically illustrates a flow chart of a method according to a yet further embodiment of the invention.

The at least one memory 502 and the computer program code 503 are configured to, with the at least one processor 502, cause the apparatus 500 at least to perform the method described, for example with respect to FIGS. 1, 3 and 6.

Although the memory 502 is illustrated as a single component it may be implemented as one or more separate components some or all of which may be integrated/removable and/or may provide permanent/semi-permanent/dynamic/cached storage.

The computer program may arrive at the apparatus 500 via any suitable delivery mechanism 511. The delivery mechanism may be, for example, a non-transitory computer-readable storage medium 511, a computer program product, a memory device, a record medium such as a compact disc read-only memory or digital versatile disc, an article of manufacture that tangibly embodies the computer program 503. The delivery mechanism may be a signal configured to reliably transfer the computer program.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The processor 501 may also comprise:
an input interface 505 via which data (such as a spatial audio input and a spatial visual input) and/or commands are input to the processor, and
an output interface 506 via which data (such as a spatial audio output and spatial visual output) and/or commands are output by the processor.

As shown in outline, the apparatus may further comprise a spatial audio capture device 507 and a spatial visual capture device 508 each in communication with the input interface 505. Alternatively, the input interface 505 may just receive date from and be in communication with a remote spatial audio capture device and a remote spatial visual capture device.

As shown in outline, the apparatus may further comprise a spatial audio rendering device 509 (e.g. a plurality of speakers) and a spatial visual rendering device 510 (e.g. a display device) each in communication with the output interface 505. Alternatively, the out interface 506 may just be in communication with a remote spatial audio rendering device (e.g. remote speakers/headphones) and a remote visual rendering device (e.g. remote LCD display).

The apparatus 500 may be provided in a module. As used here 'module' refers to a unit or apparatus that excludes certain parts/components that would be added by an end manufacturer or a user.

Although embodiments of the apparatus have been described in terms of comprising various components, it should be understood that the components may be embodied as or otherwise controlled by a corresponding processing element or processor of the apparatus. In this regard, each of the components described may be any device, means or circuitry embodied in hardware, software or a combination of hardware and software that is configured to perform the corresponding functions of the respective components as described above.

The apparatus 500 may, for example, be a client device, server device, mobile cellular telephone, a wireless communications device, a hand-portable electronic device etc or a module for use in any of the foregoing.

In one embodiment, the apparatus 500 is embodied on a hand held portable electronic device, such as a mobile telephone or personal digital assistant, that may additionally provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. Moving Picture Experts Group-1 Audio Layer 3 (MP3) or other format and/or (frequency modulation/amplitude modulation) radio broadcast recording/playing), downloading/sending of data functions, image capture function (e.g. using a (e.g. in-built) digital camera), and gaming functions.

FIG. 6 schematically illustrates a block diagram of a method 600 according to a yet further embodiment of the invention in which aural effects can be added to the spatial audio output based on positional information derived from the spatial visual input.

The flowchart of FIG. 6 represents one possible scenario among others. The order of the blocks shown is not absolutely required, so in principle, the various steps can be performed out of order. Also, not all the steps are essential.

The method comprises blocks 101, 301, 302, 303, 304, 305 and 306 as per FIGS. 1 and 3. However, the method 600 additionally comprises block 601 in which a determination is made, from the spatial visual output of block 306, of positional information of one or more objects imaged in the spatial visual output. Such positioning information may relate to a virtual depth or distance from an imaging plane of the imaged object. The imaged object may be determined to correspond to the audio cue/source.

In block 602, a spatial audio output is generated that is dependent upon: the spatial audio input from block 101, the direction of interest from block 305 and the positional information from block 601.

Figure 7A:
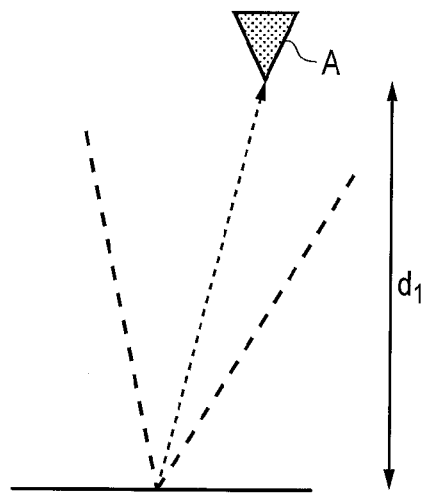
FIGS. 7a and 7b schematically illustrate imaging objects at differing distances.
Figure 7B:
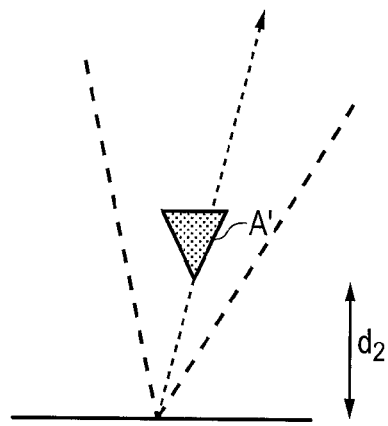

For example, the spatial audio output may be attenuated in dependence on an imaged object's virtual distance or visual depth. With regards to FIG. 7a, where an imaged object, A is perceived at a distance, d1, deemed to be far away the spatial audio output may be reduced in amplitude. Alternatively, with regards to FIG. 7b, the spatial audio output may be amplified in dependence on an imaged object's distance, such that where an imaged object, A', is perceived to be at a distance, d2, considered to be close, the spatial audio output may be increased in amplitude.

Figure 8A:
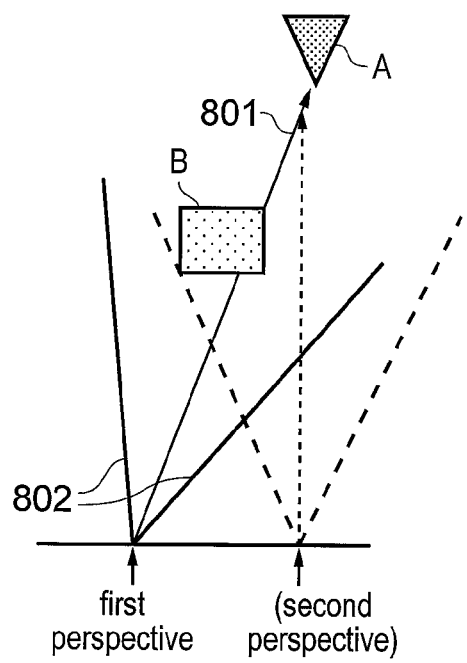
FIGS. 8a and 8b schematically illustrate imaging objects from a perspective of a first and second field of view respectively.

With regards to FIGS. 8a, the positioning information of block 601 may alternatively relate to a position of one or more objects, A and B, when imaged from a first perspective corresponding the direction of the interest 801, i.e. when imaged from the frame of reference of the generated spatial visual output having a first field of view 802 centred about the direction of interest 801. Such positional information may relate to the imaged object's relative location within the visual output in a first frame of reference or a determined virtual position of the imaged object with respect to the first frame of reference.

In a refinement of the method of claim 6, block 603 (shown in outline) may be provided in which positional information is determined relating to a relative position of the imaged objects, A and B, when imaged from a different direction 803, i.e. a second field of view 803 different from the first.

In this case, the spatial audio output generated in block 602 is modified based on both the positional information from a first perspective of block 601 as well as positional information from a second perspective of block 603. The resultant spatial audio output generated is thus correspondingly dependent upon the varying visual perspectives of the spatial visual information.

Figure 8B:
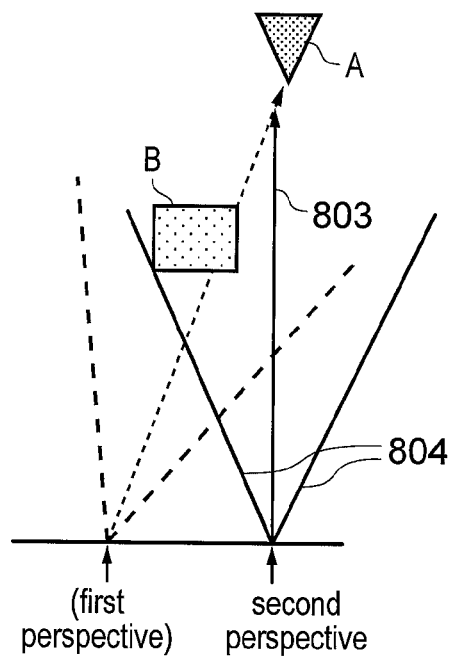

Based on knowledge of the positional information of 2 or more objects from each of a first and second perspective/field of view, it is possible to determine if one object 'eclipses' or 'shadows' the other object when changing between the fields of view. For example, as is shown in FIG. 8a, from the first perspective 802, there is no clear line of sight to object A as it is behind or "eclipsed" by object B. However, as is shown in FIG. 8b, from the second perspective 804 there is a clear line of sight to both of the objects A and B.

By taking into account positional information derived from differing fields of view (such as a change in a field of view resulting from alighting the direction of a field of view with a direction of interest) one can adjust the spatial audio output based on "visual eclipsing" of one object with respect to another (e.g. A eclipsed by B or to put it another way, A being in B's shadow) so as to provide equivalent "audio eclipsing". For example, the spatial audio signal could be attenuated where eclipsing of imaged objects is determined based on a change of visual perspective/change of field of view.

Advantageously, the provision of aural effects, such as "audio eclipsing" further enhance the generated spatial audio output to match the generated spatial visual output by providing an audio output that takes into account the position of objects in the field of view of the visual output.

Embodiments of the present invention provide both a method and corresponding apparatus consisting of various modules or means that provide the functionality for performing the steps of the method. The modules or means may be implemented as hardware, or may be implemented as software or firmware to be performed by a computer processor. In particular, in the case of firmware or software, embodiments of the invention can be provided as a computer program product including a computer readable storage structure embodying computer program code (i.e. the software or firmware) thereon for performing by the computer processor.

Embodiments of the invention have been described using flowchart illustrations and schematic block diagrams. It will be understood that each block (of the flowchart illustrations and block diagrams), and combinations of blocks, can be implemented by computer program instructions of a computer program. These program instructions may be provided to one or more controllers or processors such that the instructions which execute on the processor(s) create means for implementing the functions specified in the block or blocks. The computer program instructions may be executed by the processor(s) to cause a series of operational steps to be performed by the processor(s) to produce a computer implemented process such that the instructions which execute on the processor(s) provide steps for implementing the functions specified in the block or blocks.

Accordingly, the blocks support: combinations of means for performing the specified functions; combinations of steps for performing the specified functions; and computer program instructions for performing the specified functions. It will also be understood that each block, and combinations of blocks, can be implemented by special purpose hardware-based systems which perform the specified functions or steps, or combinations of special purpose hardware and computer program instructions.

The illustration of a particular order to the blocks does not necessarily imply that there is a required or preferred order for the blocks and the order and arrangement of the block may be varied. Furthermore, it may be possible for some steps to be omitted.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Although various embodiments of the present invention have been described in the preceding paragraphs with reference to various examples, it should be appreciated that modifications to the examples given can be made without departing from the scope of the invention as claimed.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A computer implemented method comprising causing, at least in part, actions that result in:
   receiving, at at least one processor, a spatial audio input;
   determining, by the at least one processor, a direction of interest from the spatial audio input;
   receiving, at the at least one processor, a spatial visual input;
   determining, by the at least one processor, positional information related to one or more imaged objects from the spatial visual input;
   determining, by the at least one processor, if one imaged object is eclipsed by another imaged object based on the positional information; and
   generating, by the at least one processor, a spatial audio output based on the spatial audio input, wherein the spatial audio output generated is dependent on:
   the direction of interest,
   the positional information, and
   the determination if one imaged object is eclipsed by another imaged object.

2. The method of claim 1, wherein the positional information relates to one or more perceived depths of the one or more imaged object.

3. The method of claim 1, further comprising identifying, by the at least processor, an aural cue from the spatial audio input, and preferably further comprising determining, from the spatial audio input, positional information of the aural cue, and yet further preferably wherein the determination of the direction of interest is dependent on the positional information of the aural cue.

4. The method of claim 1, wherein the spatial audio output comprises an aural spatial directivity and the direction of the aural spatial directivity is aligned with the direction of interest.

5. The method of claim 1, further comprising generating, by the at least one processor, a visual output dependent on the direction of interest.

6. The method of claim 5, wherein the visual output comprises a visual spatial directivity and the direction of the visual spatial directivity is aligned with the direction of interest.

7. The method of claim 5, wherein the visual output is associated with a position of a field of view and wherein the determination of the direction of interest is dependent on the position of the field of view.

8. The method of claim 5, wherein the visual output is associated with a direction of a field of view, and wherein the direction of the field of view is dependent on the direction of interest.

9. The method of claim 5, wherein the spatial visual input is configured to represent information relating to visual spatial directivity, and wherein the generation of the visual output comprises at least one of:
  selecting a direction of visual spatial directivity of the visual output that corresponds to the direction of interest, and
  synthesising, from the spatial visual input, an image associated with a field of view having a direction that corresponds to the direction of interest.

10. The method of claim 5, further comprising:
  determining, at the at least one processor, from the visual output, positional information of an imaged object; and
  wherein the generating of a spatial audio output is further dependent on the positional information.

11. The method of claim 10, wherein the spatial audio input comprises positional information relating to an audio source, the method further comprising associating the imaged object with the audio source.

12. The method of claim 5, further comprising:
  determining, by the at least one processor, a first set of positional information relating to a plurality of imaged objects at a first field of view based on the visual output;
  determining, by the at least one processor, a second set of positional information relating to the plurality of imaged objects at a second field of view based on the visual output; and
  wherein the generating of a spatial audio output is further dependent on the first and second sets of positional information.

13. The method of claim 12, further comprising:
  determining, by the at least one processor, if one of the plurality of imaged objects is eclipsed by another of the plurality of imaged objects when changing from the first field of view to the second field of view.

14. An apparatus comprising:
  at least one processor; and
  at least one memory storing computer program instructions configured, working with the at least one processor, to cause the apparatus to perform:
  receiving a spatial audio input;
  determining a direction of interest from the spatial audio input;
  receiving a spatial visual input;
  determining positional information related to one or more imaged objects from the spatial visual input;
  determining, by the at least one processor, if one imaged object is eclipsed by
  another imaged object based on the positional information: and
  generating a spatial audio output based on the spatial audio input, wherein the spatial audio output generated is dependent on:
    the direction of interest,
    the positional information, and
    the determination if one imaged object is eclipsed by another imaged object.

15. The apparatus of claim 14, wherein the positional information relates to one or more perceived depths of the one or more imaged objects.

16. A module or a device comprising the apparatus of claim 14.

17. A non-transitory computer readable medium embodying computer program instructions that, when performed by at least one processor, causes method as claimed in claim 1 to be performed.

18. The method of claim 1, wherein the spatial audio output is generated from the spatial audio input by adjusting a spatial aural directivity of the spatial audio input.

* * * * *